US012644841B2

(12) United States Patent
Smith et al.

(10) Patent No.:    US 12,644,841 B2
(45) Date of Patent:    Jun. 2, 2026

(54) SPECTROSCOPIC APPARATUS AND METHODS FOR DETERMINING COMPONENTS PRESENT IN A SAMPLE

(71) Applicant: RENISHAW PLC, Wotton-Under-Edge (GB)

(72) Inventors: Brian John Edward Smith, Dursley (GB); Ian Mac Bell, Dursley (GB)

(73) Assignee: RENISHAW PLC, Wotton-under-Edge (GB)

( * ) Notice: Subject to any disclaimer, the term of this patent is extended or adjusted under 35 U.S.C. 154(b) by 698 days.

(21) Appl. No.: 17/630,599

(22) PCT Filed: Sep. 1, 2020

(86) PCT No.: PCT/GB2020/052083
    § 371 (c)(1),
    (2) Date: Jan. 27, 2022

(87) PCT Pub. No.: WO2021/038252
    PCT Pub. Date: Mar. 4, 2021

(65) Prior Publication Data
    US 2022/0252516 A1    Aug. 11, 2022

(51) Int. Cl.
    *G01N 21/65*    (2006.01)
(52) U.S. Cl.
    CPC .................................... *G01N 21/65* (2013.01)
(58) Field of Classification Search
    None
    See application file for complete search history.

(56) References Cited

U.S. PATENT DOCUMENTS

| 5,442,438 | A | 8/1995 | Batchelder et al. |
| 5,510,894 | A | 4/1996 | Batchelder et al. |

(Continued)

FOREIGN PATENT DOCUMENTS

| CN | 1516859 | A | 7/2004 |
| CN | 101042868 | A | 9/2007 |

(Continued)

OTHER PUBLICATIONS

Cezard, Nicolas, et al. "Supercontinuum laser absorption spectroscopy in the mid-infrared range for identification and concentration estimation of a multi-component atmospheric gas mixture." Lidar Technologies, Techniques, and Measurements for Atmospheric Remote Sensing VII. vol. 8182. SPIE, 2011. (Year: 2011).*
Xie et al., "Quantitative calibration of multi-component systems with a known range of possibly co-existing species," Analytica Chimica Acta, 1993, vol. 272, pp. 61-72.

(Continued)

*Primary Examiner* — Raymond L Nimox
(74) *Attorney, Agent, or Firm* — Oliff PLC

(57)    ABSTRACT
A method of determining components present in a sample from spectral data obtained from the sample including resolving each of a plurality of models of the spectral data, the plurality of models including models having a different number of component reference spectra selected from a set of predetermined component reference spectra; selecting a one of the plurality of models based upon a model selection criterion and determining one or more components present in the sample based upon the selected model. The model selection criterion includes a measure for each model, which balances improvements in fit quality of the model to the spectral data against a complexity penalty determined from the number of component reference spectrum used in the model.

18 Claims, 8 Drawing Sheets

(56) References Cited

U.S. PATENT DOCUMENTS

| | | | |
|---|---|---|---|
| 5,689,333 | A | 11/1997 | Batchelder et al. |
| 6,832,069 | B2 | 12/2004 | Stout et al. |
| 6,871,169 | B1 | 3/2005 | Hazen et al. |
| 7,457,581 | B2 | 11/2008 | Stout et al. |
| 7,707,028 | B2 | 4/2010 | Kojima |
| 7,974,570 | B2 | 7/2011 | Stout et al. |
| 8,271,209 | B2 | 9/2012 | Dasaratha et al. |
| 9,046,589 | B2 | 6/2015 | Gjesdal et al. |
| 2006/0242214 | A1* | 10/2006 | Tominaga ............... G06F 18/00 708/200 |
| 2011/0153226 | A1* | 6/2011 | Dasaratha ............ G01N 21/359 702/27 |
| 2014/0085630 | A1 | 3/2014 | Bell et al. |
| 2016/0043526 | A1 | 2/2016 | Kutz et al. |
| 2018/0150969 | A1 | 5/2018 | Niwayama |

FOREIGN PATENT DOCUMENTS

| | | | |
|---|---|---|---|
| CN | 108120391 A | 6/2018 | |
| NO | 20101638 A1 | 5/2012 | |
| WO | 2006/088350 A1 | 8/2006 | |
| WO | 2012/150434 A2 | 11/2012 | |
| WO | 2012/156667 A1 | 11/2012 | |
| WO | 2014/064447 A1 | 5/2014 | |
| WO | 2020/079439 A1 | 4/2020 | |

OTHER PUBLICATIONS

Banerjee et al.; "Interpreting Multicomponent Infrared Spectra by Derivative Minimization;" Appl Spectrosc; 1991; pp. 1047-1049; vol. 45, No. 6.

Cézard et al.; "Supercontinuum laser absorption spectroscopy in the mid-infrared range for identification and concentration estimation of a multi-component atmospheric gas mixture;" Proc. of SPIE; 2001; pp. 81820V-1-81820V-12; vol. 8182.

Fade et al.; "Minimum Description Length approach for unsupervised spectral unmixing of multiple interfering gas species;" Optics Express; 2011; pp. 525-530, vol. 19, No. 15.

Kumar; "Application of Akaike information criterion assisted probabilistic latent semantic analysis on non-trilinear total synchronous fluorescence spectroscopic data sets: Automatizing fluorescence based multicomponent mixture analysis;" Analytica Chimica Acta; 2019; pp. 60-67; vol. 1062.

Huang et al.; "Active wavelength selection for mixture identification with tunable mid-infrared detectors;" Analytica Chimica Acta; 2016; pp. 11-20; vol. 937.

Nov. 13, 2020 Search Report issued in International Patent Application No. PCT/GB2020/052083.

Nov. 13, 2020 Written Opinion of the International Searching Authority issued in International Patent Application No. PCT/GB2020/052083.

Feb. 18, 2020 Search Report issued in British Patent Application No. GB1912439.5.

* cited by examiner

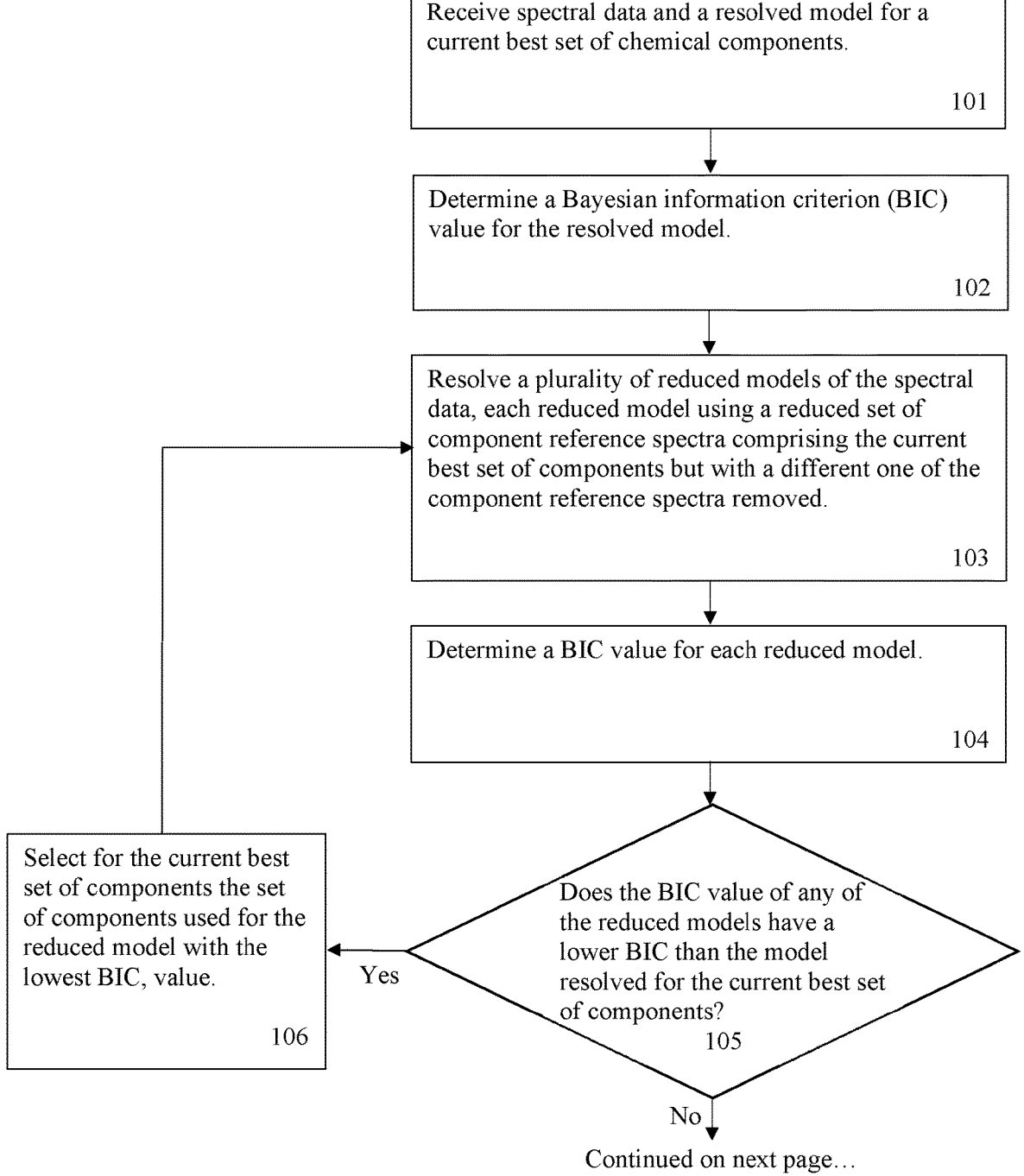

Receive spectral data and a resolved model for a current best set of chemical components.

101

Determine a Bayesian information criterion (BIC) value for the resolved model.

102

Resolve a plurality of reduced models of the spectral data, each reduced model using a reduced set of component reference spectra comprising the current best set of components but with a different one of the component reference spectra removed.

103

Determine a BIC value for each reduced model.

104

Select for the current best set of components the set of components used for the reduced model with the lowest BIC, value.

106

Does the BIC value of any of the reduced models have a lower BIC than the model resolved for the current best set of components?

105

Yes

No

Continued on next page...

Fig. 2

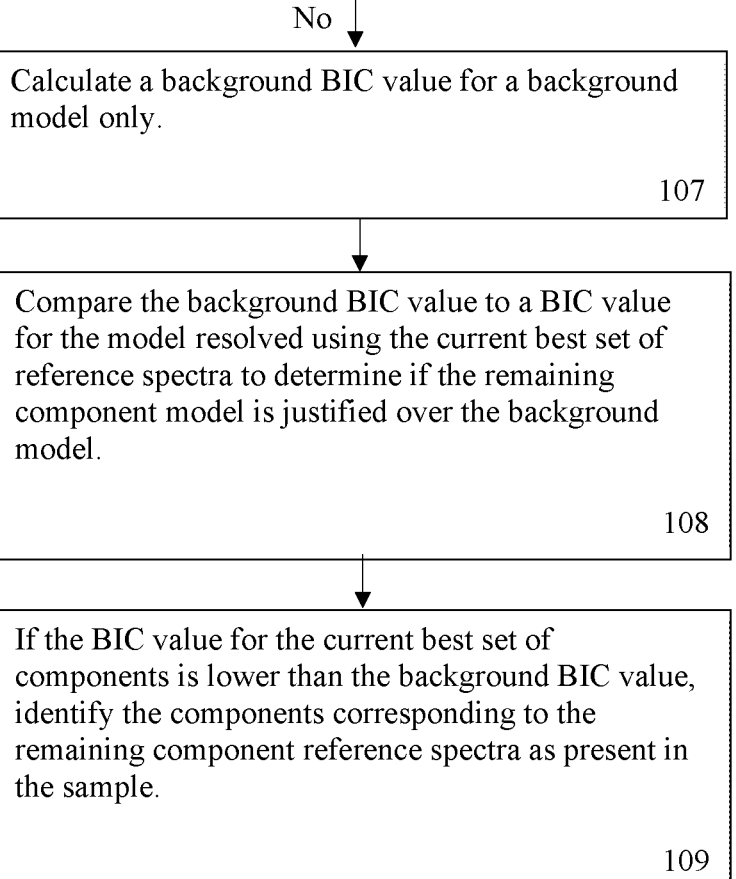

No ↓

Calculate a background BIC value for a background model only.

107

Compare the background BIC value to a BIC value for the model resolved using the current best set of reference spectra to determine if the remaining component model is justified over the background model.

108

If the BIC value for the current best set of components is lower than the background BIC value, identify the components corresponding to the remaining component reference spectra as present in the sample.

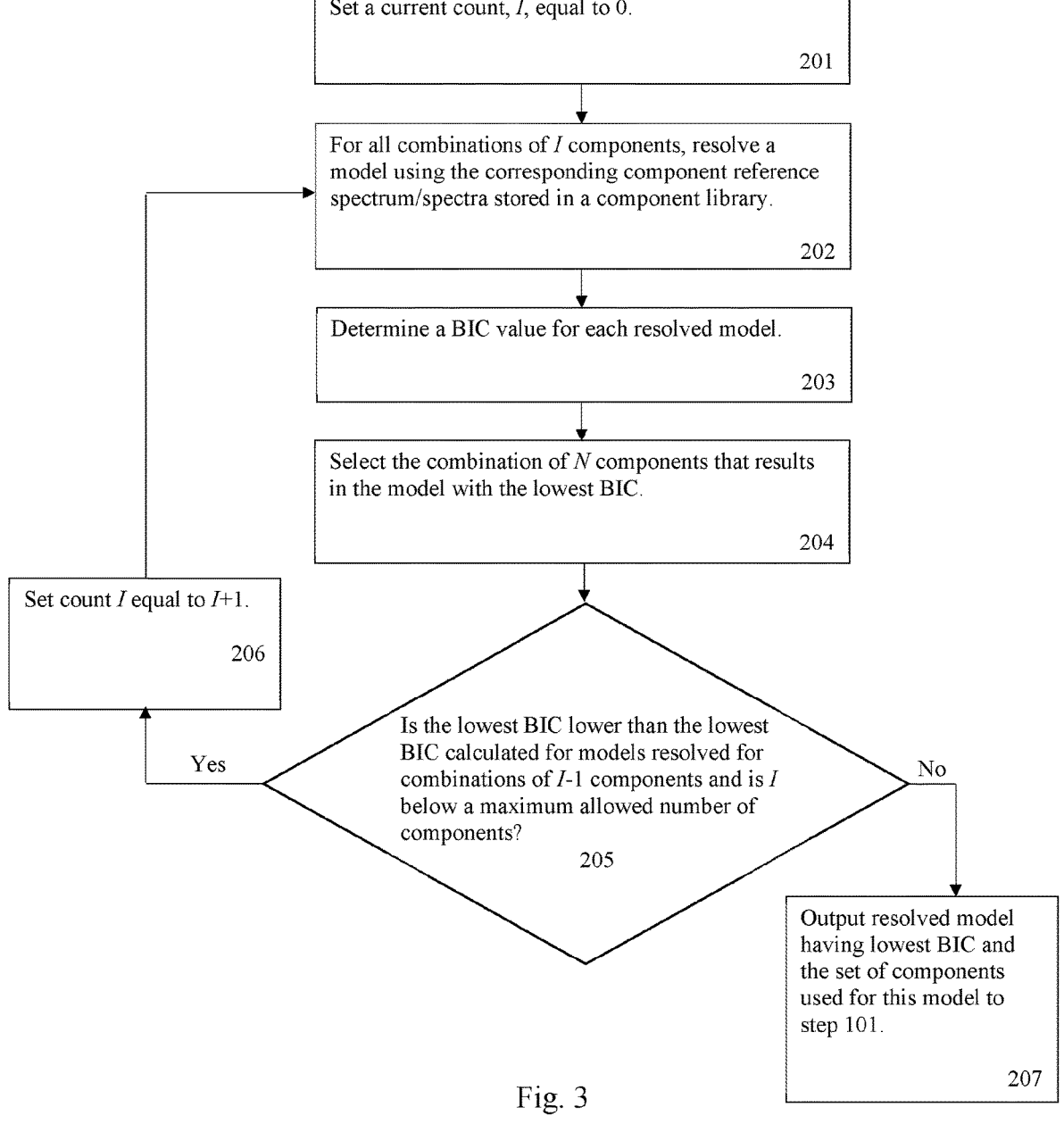

Set a current count, *I*, equal to 0.

201

For all combinations of *I* components, resolve a model using the corresponding component reference spectrum/spectra stored in a component library.

202

Determine a BIC value for each resolved model.

203

Select the combination of *N* components that results in the model with the lowest BIC.

204

Set count *I* equal to *I*+1.

206

Is the lowest BIC lower than the lowest BIC calculated for models resolved for combinations of *I*-1 components and is *I* below a maximum allowed number of components?

205

Yes

No

Output resolved model having lowest BIC and the set of components used for this model to step 101.

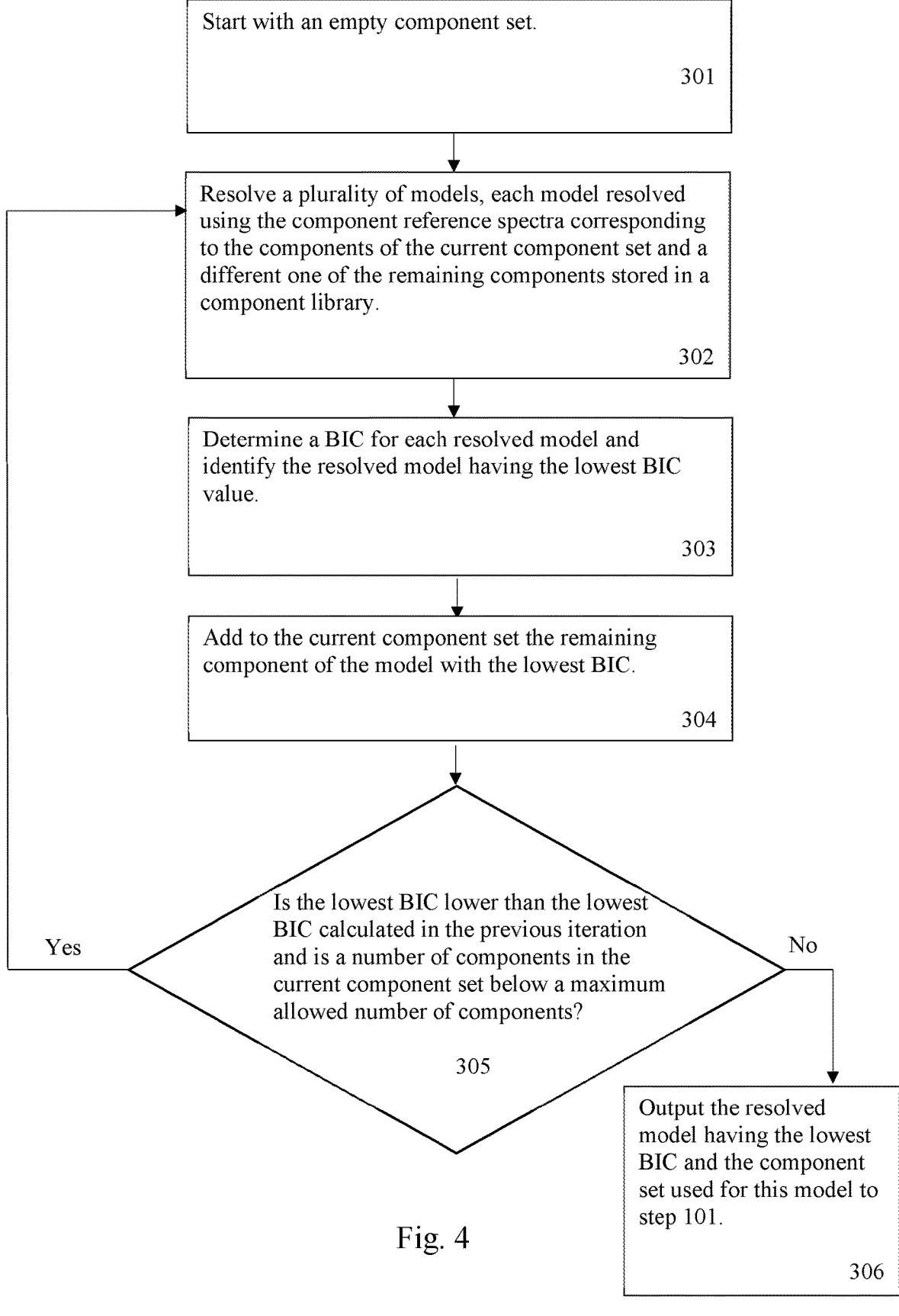

Start with an empty component set.

301

Resolve a plurality of models, each model resolved using the component reference spectra corresponding to the components of the current component set and a different one of the remaining components stored in a component library.

302

Determine a BIC for each resolved model and identify the resolved model having the lowest BIC value.

303

Add to the current component set the remaining component of the model with the lowest BIC.

304

Is the lowest BIC lower than the lowest BIC calculated in the previous iteration and is a number of components in the current component set below a maximum allowed number of components?

305

Yes

No

Output the resolved model having the lowest BIC and the component set used for this model to step 101.

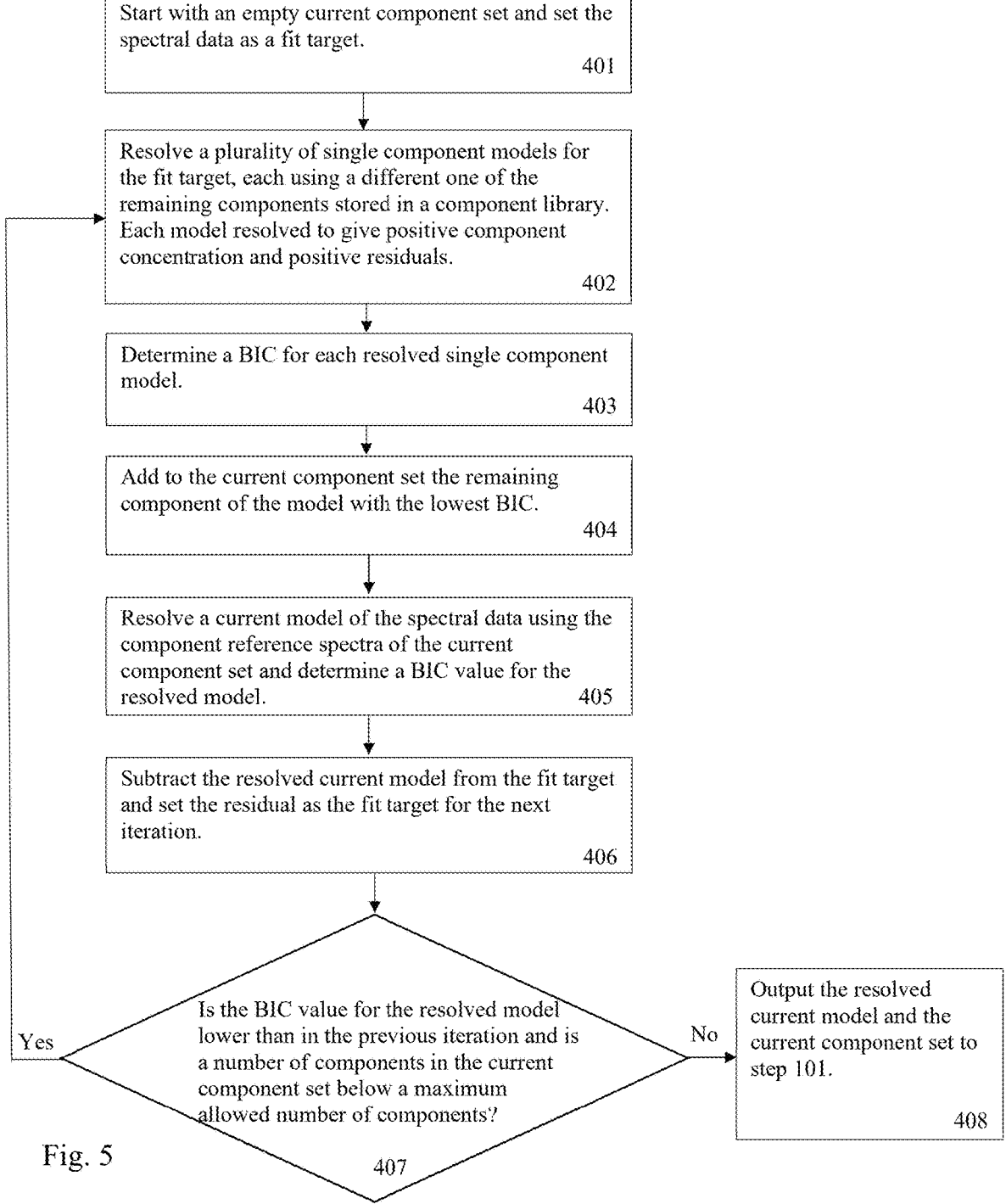

Start with an empty current component set and set the spectral data as a fit target.

401

Resolve a plurality of single component models for the fit target, each using a different one of the remaining components stored in a component library. Each model resolved to give positive component concentration and positive residuals.

402

Determine a BIC for each resolved single component model.

403

Add to the current component set the remaining component of the model with the lowest BIC.

404

Resolve a current model of the spectral data using the component reference spectra of the current component set and determine a BIC value for the resolved model.

405

Subtract the resolved current model from the fit target and set the residual as the fit target for the next iteration.

406

Is the BIC value for the resolved model lower than in the previous iteration and is a number of components in the current component set below a maximum allowed number of components?

407

Yes

No

Output the resolved current model and the current component set to step 101.

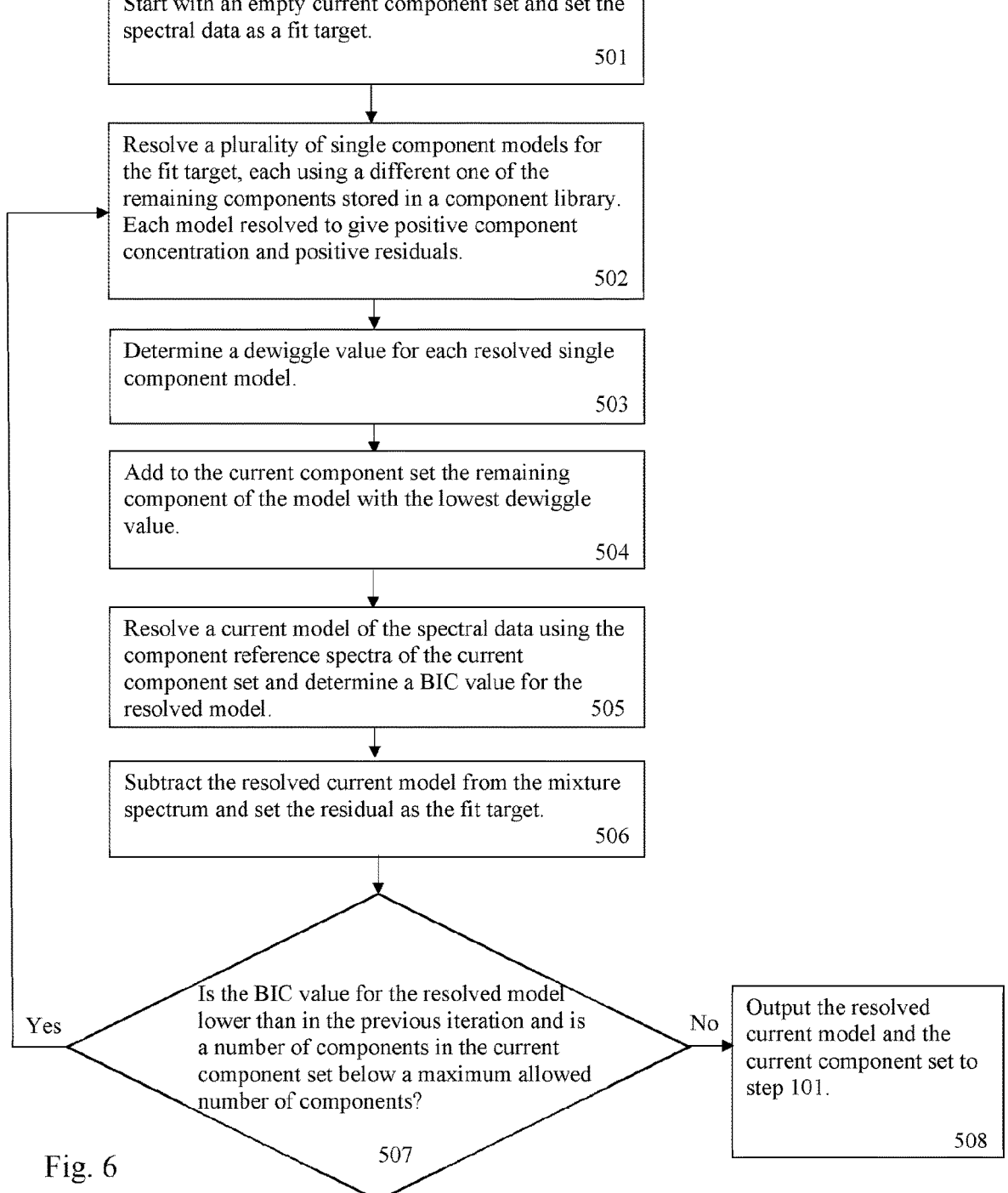

Start with an empty current component set and set the spectral data as a fit target.

501

Resolve a plurality of single component models for the fit target, each using a different one of the remaining components stored in a component library. Each model resolved to give positive component concentration and positive residuals.

502

Determine a dewiggle value for each resolved single component model.

503

Add to the current component set the remaining component of the model with the lowest dewiggle value.

504

Resolve a current model of the spectral data using the component reference spectra of the current component set and determine a BIC value for the resolved model.          505

Subtract the resolved current model from the mixture spectrum and set the residual as the fit target.

506

Is the BIC value for the resolved model lower than in the previous iteration and is a number of components in the current component set below a maximum allowed number of components?

507

Yes

No

Output the resolved current model and the current component set to step 101.

SPECTROSCOPIC APPARATUS AND METHODS FOR DETERMINING COMPONENTS PRESENT IN A SAMPLE

FIELD OF THE INVENTION

This invention relates to spectroscopic apparatus and methods for determining components present in a sample. It is particularly useful in Raman spectroscopy, though it can also be used in other forms of spectroscopy, e.g. using narrow-line photoluminescence, fluorescence, cathode-luminescence, UV visible (UV Vis), nuclear magnetic resonance (NMR), mid infra-red (mid-IR) or near infra-red (NIR).

BACKGROUND

The Raman Effect is the inelastic scattering of light by a sample. In Raman Spectroscopy, a sample is irradiated by monochromatic laser light and the scattered light is then dispersed into a Raman spectrum by a dispersive device, such as a diffraction grating, e.g. in a monochromator, to generate a spectrum called a Raman spectrum. The Raman spectrum is detected by a detector such as a charge-coupled device (CCD). Examples of Raman spectroscopy apparatus are known from U.S. Pat. Nos. 5,442,438 and 5,510,894, which are incorporated herein by reference.

Different chemical compounds have different characteristic Raman spectra. Accordingly, the Raman effect can be used to analyse the chemical compounds present.

One such technique for analysing Raman spectra is the Classical Least Squares method (CLS). This standard technique analyses spectral data S of an unknown sample in terms of a set of, I, known component reference spectra L each having $N_p$ data points (both may be subject to pre-processing). Component concentrations, $a_i$, for each component reference spectrum are determined by minimising the sum of the squared deviations of the spectral data from the reconstructed model, $$\sum_{n=1}^{N_p} \left[ S_n - \sum_{i=1}^{I} a_i L_{i,n} \right]^2 \tag{1}$$

where n represents the spectral frequency index. This results in a series of linear equations which are solved directly by matrix inversion for the component concentrations $a_i$.

CLS will typically produce a solution in which the calculated concentrations of all components are non-zero, even those that are not present in the sample, i.e. overfitting. In general, this is due to the noise present in the spectral data and differences between the reference spectra and data, which can arise due to sample environmental conditions or drift in the spectrometer performance for example. When all components in the sample are present at high concentration, it is a simple matter of comparing the calculated component concentrations to discriminate between components which are present and those that are not. However, when some components are present in trace amounts it becomes more difficult to distinguish between components that are genuinely present, and those that have low $a_i$ values due to noise etc.

WO2012/156667 describes a method of determining components present in a sample from spectral data obtained from the sample. The method comprises resolving a model of the spectral data separately for candidates from a set of predetermined component reference spectra and determining whether a component is present in the sample based upon a measure of goodness of fit.

A problem with this method is that the cut-off metric for the addition of further component spectra to the model is heuristic and thus can still result in overfitting, or less likely, underfitting, of the model to the spectral data.

SUMMARY OF INVENTION

According to a first aspect of the invention there is provided a method of determining components present in a sample from spectral data obtained from the sample. The method may comprise resolving each of a plurality of models of the spectral data, the plurality of models comprising models having a different number of component reference spectra selected from a set of predetermined component reference spectra; selecting a one of the plurality of models based upon a model selection criterion and determining one or more components present in the sample based upon the selected model. The model selection criterion may comprise a (numerical) measure for each model, which balances improvements in fit quality, such as measured using the likelihood function, of the model to the spectral data against a complexity penalty determined from the number of component reference spectrum used in the model. The model selection criterion may be the Bayesian information criterion (BIC) or the Akaike information criterion (AIC). The model selection criterion may comprise selecting the one of the plurality of models having an extremum value for the measure, for example, in the case of BIC or AIC, the lowest value.

In this way, identification of additional components in the sample as a result of overfitting the model to the spectral data or exclusion of components in the sample as a result of underfitting the model to the spectral data is avoided.

Resolving each model may comprise a least-squares fitting of the component spectra to the spectral data, such as the model having the form described by equation (1) or (2). The model may include additional terms for modelling the blank that supports the sample and/or the background radiation. The background radiation may be modelled using polynomials, in particular splines, as described in WO2012/150434, WO2014/064447 and unpublished application GB1817028.2, which are incorporated herein by reference.

The plurality of models may comprise a set of first models, each first model having a first number of component reference spectra selected from the set of predetermined component reference spectra but a different combination of the component reference spectra. The method may comprise determining the best first model in accordance with a figure of merit, such as the or a further model selection criterion. The further model selection criterion may comprise a (numerical) measure for each model, which balances improvements in fit quality, such as measured using the likelihood function, of the model to the spectral data against a complexity penalty determined from the number of component reference spectrum used in the model. The further model selection criterion may be the Bayesian information criterion (BIC) or the Akaike information criterion (AIC).

The plurality of models may comprise a set of second models, each second model having a second number (different from the first number) of component reference spectra selected from the set of predetermined component reference spectra but a different combination of the component reference spectra. The method may comprise determining the best second model in accordance with the figure of merit. The method may comprise selecting between the best first model and the best second model based on the model selection criteria.

The method may comprise resolving a current model using a current set of the component reference spectra, determining a current measure for the current model based upon the model selection criterion, resolving a plurality of further models, wherein each further model uses a further set of the component reference spectra comprising the current set with a different one of the component reference spectra removed or a different remaining component reference spectra of the predetermined component reference spectra added, determining a further measure for each of the further models based upon the model selection criterion and comparing the further measures to the current measure and selecting the best further model to be the (new) current model if the further measure for that best further model is better than the current measure. This method may be repeated (for example in an iterative process) until none of the further measures are better than the current measure. In the case where component reference spectra are progressively removed in each iteration, the current set of the component reference spectra for the first iteration may be all the predetermined component reference spectra or a set of the component reference spectra found using a search algorithm. In the case where component reference spectra are progressively added in each iteration, the current set of the component reference spectra for the first iteration may be an empty set.

The search algorithm may comprise resolving a model of the spectral data separately for candidates from a set of predetermined component reference spectra and selecting a candidate component reference spectrum of the candidate component reference spectra to be included in the current set of the component reference spectra for the initial iteration based on a figure of merit. The figure of merit may be a measure of goodness of fit, a model section criterion, such as the Bayesian information criterion (BIC) or the Akaike information criterion (AIC) or a measure minimising a difference between successive residuals between the resolved model and the spectral data, for example using the dewiggle method.

The method may comprise carrying out spectroscopy, such as Raman spectroscopy, of a sample to obtain the spectral data. The method may comprise identifying one or more components present in the sample based upon the component reference spectra used in the selected model (of the final iteration in the case that the method is applied iteratively). The method may comprise controlling a process and/or carrying out subsequent processing of the sample based upon the components identified as present in the sample. For example, the process may be a manufacturing process. The sample may be a sample of one or more manufactured products and the one or more identified components may be used to determine if the manufactured products meet a required specification. Failure to meet the required specification may require an adjustment of the process such that products are manufactured to the required specification. The sample may be a tissue sample and the process may be treatment of a patient providing the tissue sample. The method may be used as part of a checking procedure, for example a security procedure or a quality control procedure, comprising generating an alarm based upon the identification.

According to a second aspect of the invention there is provided a processor arranged to carry out the method of the first aspect of the invention.

According to a third aspect of the invention there is provided a spectrometer system comprising a spectrometer for obtaining spectral data from a sample and a processor according to the second aspect of the invention.

According to a fourth aspect of the invention there is provided a data carrier having instructions stored thereon, which instructions, when executed by a process cause the processor to carry out the method of the first aspect of the invention.

The data carrier may be a non-transient data carrier, such as volatile memory, e.g. RAM, non-volatile memory, e.g. ROM, flash memory and data storage devices, such as hard discs, optical discs, or a transient data carrier, such as an electronic or optical signal.

DESCRIPTION OF THE DRAWINGS

FIG. 2 is a flowchart showing a method for determining components present in a sample according to an embodiment of the invention;

FIG. 3 is a flowchart showing a method for determining a mixture spectrum for use in the method shown in FIG. 2 according to an embodiment of the invention;

FIG. 4 is a flowchart showing a method for determining a mixture spectrum for use in the method shown in FIG. 2 according to another embodiment of the invention;

FIG. 5 is a flowchart showing a method for determining a mixture spectrum for use in the method shown in FIG. 2 according to yet another embodiment of the invention;

FIG. 6 is a flowchart showing a method for determining a mixture spectrum for use in the method shown in FIG. 2 according to a yet further embodiment of the invention.

DESCRIPTION OF EMBODIMENTS

Figure 1:
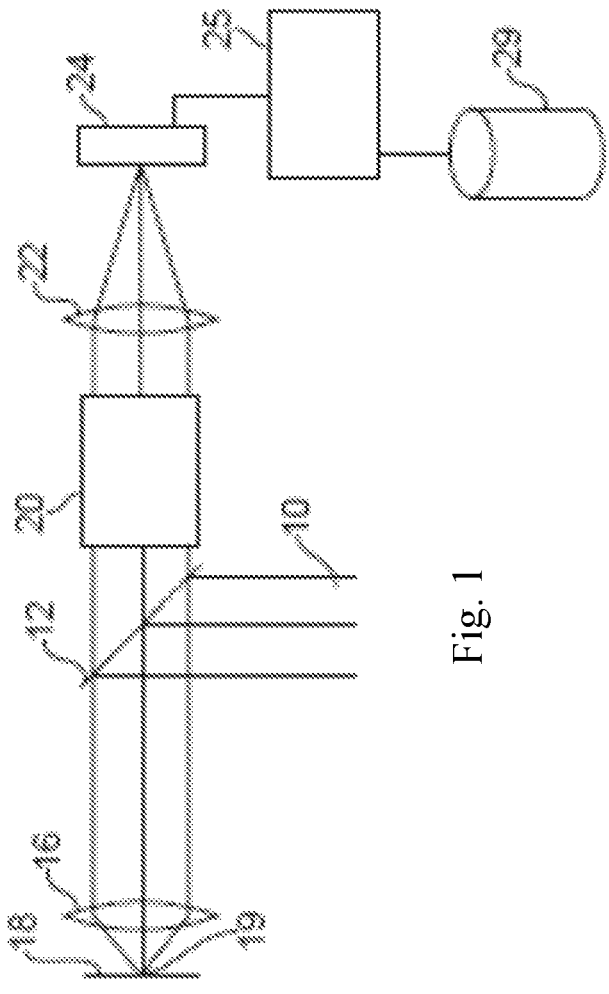
FIG. 1 is a schematic of a Raman spectroscopy system according to an embodiment of the invention.

Referring to FIG. 1, apparatus according to the invention comprises a Raman spectrometer connected to a computer 25 that has access to memory 29.

The Raman spectrometer comprises an input laser beam 10 reflected through 90 degrees by a dichroic filter 12, placed at 45 degrees to the optical path. Alternatively, a holographic dichroic filter may be placed at a low angle of incidence such as 10 degrees. The laser beam then passes to an objective lens 16, which focuses it at its focal point 19 on a sample 18. Light is scattered by the sample, collected by the objective lens 16 and collimated into a parallel beam which passes back to the dichroic filter 12. The filter 12 rejects Rayleigh scattered light having the same frequency as the input laser beam 10 and transmits the Raman scattered light. The Raman scattered light then passes to a Raman analyser 20.

The Raman analyser 20 comprises a dispersive element such as a diffraction grating. The light from the analyser 20 is focused by a lens 22 onto a suitable photo-detector. A photo-detector array is preferred. In the present embodiment the detector 24 is a charge-coupled device (CCD), which consists of a two-dimensional array of pixels, and which is connected to the computer 25 which acquires data from each of the pixels and analyses it as required. The analyser 20 produces a spectrum having various bands spread out in a line along the CCD 24.

Sample 18 may be mounted on an XYZ stage, under control of the computer 25. so that spectral data may be collected from different points on the sample. Additionally, multiple samples may be mounted at different positions on the XYZ stage so that spectra data may be obtained from each sample.

The computer 25 is programmed with software code on a suitable medium, such as memory 29, comprising instructions, which when executed by a processor of computer 25 cause the computer 25 to perform the analysis routines described below. Alternatively, the data on the Raman spectrum/spectra obtained may be transferred to a separate computer having such software for this analysis. In either case, as the analysis proceeds, the values determined are stored in the computer concerned, and may be further processed and output or displayed to show results of the analysis in terms of the components in the sample/samples. In the case where the analysis is performed by computer 25, memory 29 has stored thereon a databank/library of component reference spectra to be used for the analysis. Each component reference spectrum is a typical Raman spectrum for a different chemical component or group of chemical components.

Referring to FIG. 2, a method of analysing the spectral data is shown. The references herein to resolving a model means fitting a model to a spectrum to find parameters that fit component reference spectra to the spectrum. In this embodiment, all the models are of the form:

$$M = \sum_{i=1}^{I} (a_i \times L_i) + k \times B + \sum_{j=0}^{J} (c_j \times P_j), \qquad (2)$$

where bold denotes a spectral vector and:

M is the model of the spectrum, $a_i$ is the (positive) amount of the component reference spectrum $L_i$ of order i, k is the amount of a blank spectrum B, $c_j$ is the amount of the polynomial term $P_j$ of order j i runs over the number of components, and j runs over the range 0 to the polynomial order selected (for example, by a user) for background adjustment.

k and $c_j$ need not be positive.

The parameters $a_i$, k and $c_j$ are fitted. The polynomial terms $P_j$ are constructed as vectors of the X-axis scaled to the range −1:1 as successive powers j to avoid numeric precision issues and overflow.

At step 101, spectral data, S, and a resolved model (mixture spectrum), M, for a current best set of chemical components present in the sample that produced the spectral data is received. The current best set of components may be a subset of components selected from the library using a search algorithm, such as one of the search algorithms described below with reference to FIGS. 3 to 6. A Bayesian information criterion (BIC) value is determined 102 for the resolved model. In this embodiment, the BIC value is determined by:

$$BIC = N_p \times (MSY) + N_v \times \log(N_p) \qquad (3),$$

where:

$N_p$ *is the number of points per spectrum*

MSY is the mean square of the residual between the model of the spectrum and the spectral data, and $N_v$ is the number of variables in the model.

A plurality of reduced models of the spectral data are then resolved 103, each reduced model using a different subset of the set of components of the current best set. In this embodiment, the subset corresponds to removal of one chemical component (typically corresponding to removal of a single component reference spectra). The BIC values for these reduced models are then determined 104.

In step 105 it is determined whether any of the BIC values for the reduced models has a lower value than the BIC value for the model resolved for the current best set of components. If the BIC values for any of the reduced models has a lower value, then the components of the reduced model with the lowest BIC value are selected as the current best set of components for the sample. The iterative loop 103, 104, 105 and 106 is then repeated until a reduction in the set of components does not result in an improved (lower) BIC value.

In step 107, a background BIC value is calculated for the background components only, e.g.

$$k \times B + \sum_{j=1}^{J} (c_j \times P_j).$$

The background BIC value is compared to a remaining BIC value determined for a model resolved for the remaining component reference spectra. If the remaining BIC value is less than the background BIC value, then the system identifies, for example through an appropriate image on a display or other signal output, the remaining components as the components present in the sample. If the background BIC value is lower than the remaining BIC value, then the inclusion of the component reference spectra in the model cannot be justified based upon the spectral data. In such a scenario, the system may generate a "null" output.

In steps 107 and 108, the background term may include the blank term and/or the polynomial term. In another embodiment, steps 107 and 108 are omitted.

In a further embodiment, rather than returning a single set of components as those that are present in the sample, the algorithm may return a plurality of sets of components. The plurality of sets of components may be generated by, in each iteration, storing/updating a number, N, of the best current models as determined by the BIC value from all iterations carried out up to that point, wherein N is greater than 1. In such an embodiment, all the N best current models are progressed in the following iteration by the further removal of components. A suitable checking step may be introduced into the iterative process to avoid repetition of the same set of components. The iterative process may be terminated when no further improvement in the N best current models is achieved. The plurality of the best current models upon termination of the iterative process may be displayed such that the user can browse through these models and select the preferred model based upon further user considerations/ knowledge.

Referring to FIGS. 3 to 6, search algorithms for generating an initial best set of components present in the sample based upon the spectral data and a library of reference component spectra will now be described. It will be understood that other search algorithms may be used with the method described with reference to FIG. 2.

Referring to FIG. 3, a "full search" algorithm is shown. A counter, referred to hereinafter as "current count", I, is set 201 equal to 0. For all combinations of I components (so in the first iteration, for an empty set and, in the second iteration, each component separately) of a library of reference component spectra, a model is resolved 202. A BIC value is determined 203 for each resolved model. The combination of I components that results in the resolved model having the lowest BIC value is selected 204 and, if the BIC value is lower than the previously lowest BIC value for the I−1 components, then I is set equal to I+1 and steps 202 to 205 are repeated in an iterative process. The iterative process is terminated when the increase in the number, I, of components in each combination does not result in a resolved model with a lower BIC value and/or a maximum allowed number of components is reached. The combination of components that gives the resolved model having the lowest BIC value and the corresponding reduced model, M, as the mixture spectrum is output to step 101 of the method shown in FIG. 2.

An advantage of the full search algorithm is that every combination of, I, components is tried in each iteration fully searching the available search space for the most likely combinations of components. Such an algorithm may be appropriate in mixture analysis tasks having a small number of possible components (small library size), simple mixes and/or a small number of spectra to analyse. However, the time for execution of this search algorithm increases rapidly (non-linearly) with library size and component number. Accordingly, this search algorithm may be too slow for practical use in some tasks.

In the "successive cumulation" search algorithm of FIG. 4, initially, in step 301, no components are selected as present in the sample (a so called "empty component set"). A plurality of models are resolved 302, each model 302 comprising the component reference spectra of the current component set (for the initial iteration, no components) and a different one of the remaining reference components spectra stored in a component library. A BIC value is determined 303 for each resolved model and the resolved model having the lowest BIC value is determined. The components of the resolved model having the lowest BIC value are then added 304 to the current component set, which is passed back to step 302 for the next iteration. The iterative process is terminated if the lowest BIC value is not lower than the lowest BIC value of the previous iteration or the number of current components is a maximum allowed number of components, step 305. Upon termination of the iterative process, the model resolved in the last iteration having the lowest BIC is output 306 as the mixture spectrum to step 101 together with the component set used for this model.

The time required to carry out this search algorithm only increases linearly with library size and therefore, has a speed advantage over the algorithm disclosed with reference to FIG. 3 for some tasks (large library sizes, complex mixes and/or a large number of spectra to analyse).

In the "successive library search and subtract" algorithm shown in FIG. 5, initially, in step 401, no components are selected as present in the sample (a so called "empty component set") and the spectral data is set as a fit target. A plurality of single component models are resolved 402 for the fit target (in the first iteration, the spectral data), each single component model using a different one of the remaining component reference spectra (component reference spectra of components that have yet to be selected by the search algorithm as part of the set of components to be output to the method shown in FIG. 2). Each model is resolved to give a positive component concentration, a, and a positive residual (difference between the resolved model and the fit target). The constraint of a positive component concentration, a, and a positive residual avoids earlier fitted components masking or balancing out peaks that are important for the fitting of later components.

A BIC value is determined 403 for each resolved single component model and the component of the resolved model having the lowest BIC value is added 404 to the set of current components. A model is resolved 405 using the current component spectra against the fit target to provide a resolved model having positive component concentrations, $a_i$, and a positive residual. The resolved model is subtracted 406 from the fit target 302 to form the fit target for the next iteration. The iterative process is terminated if the lowest BIC value is not lower than the lowest BIC value of the previous iteration or a number of components of the current component set reaches a maximum allowed number of components. The resolved current model (mixture spectrum) together with the current component set is output to step 101 of the method shown in FIG. 2.

This search algorithm has a potential advantage over the search algorithm shown in FIG. 3 in that each iteration only comprises single variable optimisations.

The "successive dewiggle search and subtract" algorithm shown in FIG. 6, is similar to that described with reference to FIG. 5. However, rather than using the BIC value as a basis for choosing between the plurality of single component models, a value determined using the dewiggle algorithm (as described in S. Banerjee and D. Li, "Interpreting Multicomponent Infrared Spectra by Derivative Minimization," Appl. Spectrosc., vol. 45, no. 6, pp. 1047-1049, 1991) is used. The dewiggle value is determined from the square of the successive difference between the residuals. In step 504, the remaining component of the model with the lowest dewiggle value is added to the current component set. Use of the dewiggle value as the basis of the algorithm results in a faster search algorithm than that disclosed with reference to FIG. 5.

As with the method of analysing the spectral data shown in FIG. 2, these search algorithms may progress a plurality of different sets of components as judged by the figure of merit (BIC or dewiggle value) through the iterations and/or output a plurality of sets of components. For example, the N models with the lowest BIC values or dewiggle values as determined across all of the iterations may be output. The N best models are determined in each iteration in accordance with the BIC/dewiggle value, to result in N "parent" component sets that are passed to the next iteration. In the next iteration, a plurality of models are resolved for each of the parent component sets, each model resolved based upon the corresponding parent component set (either through the component spectra being used in each of the models plus a remaining component spectra or, in the case of the algorithm shown in FIGS. 5 and 6, to determine the fit target to which a plurality of remaining component spectra are separately fitted). It is determined whether any of these newly resolved models based on any of the parent component sets are better than the N best models passed to the iteration. If so, the list of N best component sets is updated to include the better models and passed to the next iteration and so on until the termination criteria are met.

Figure 7:
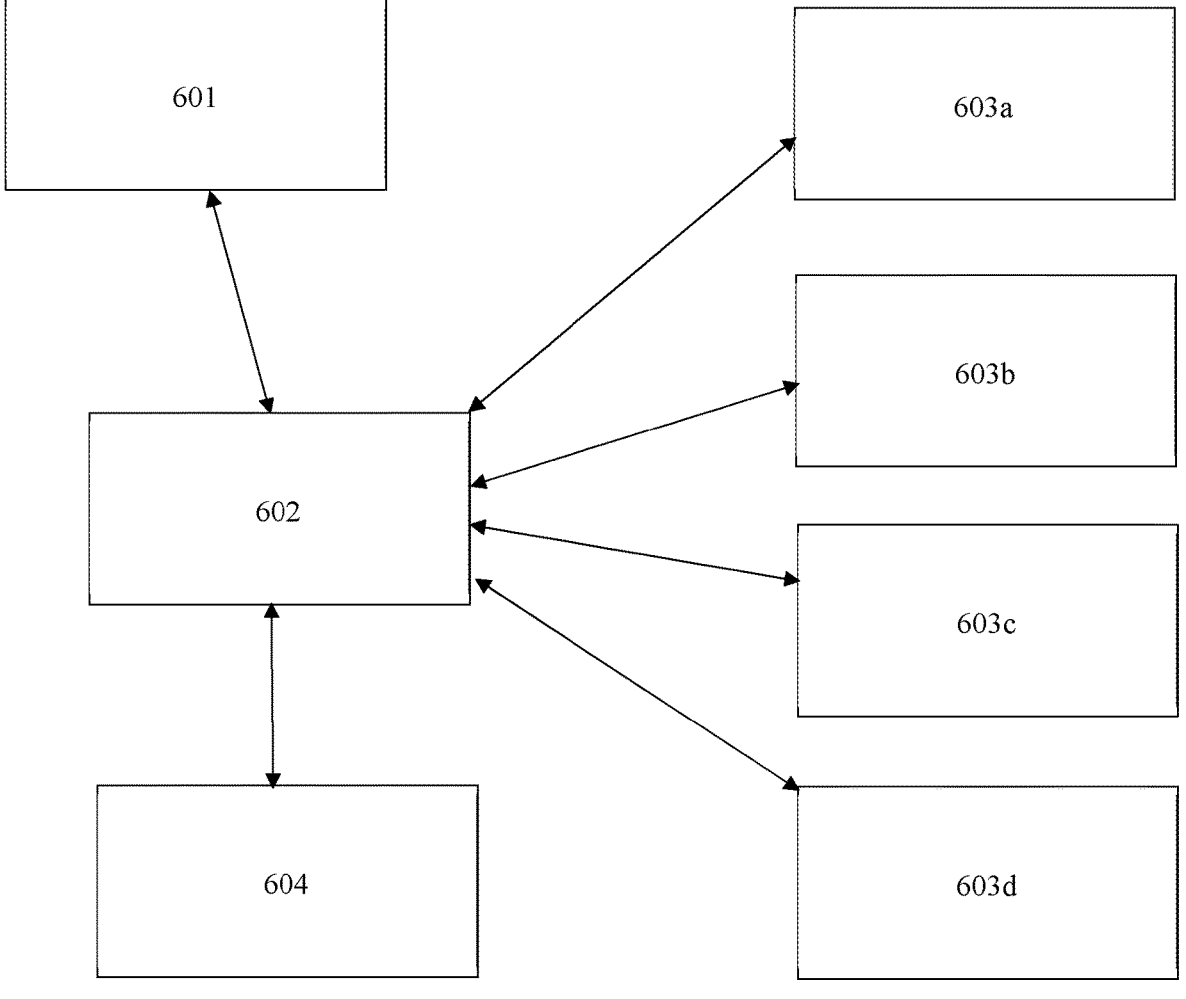
FIG. 7 is a schematic of modules of a system according to the invention.

Referring to FIG. 7, the methods may be implemented in a system comprising a plurality of modules comprising a spectrometer 601, a control module 602, an analysis module 604 and a plurality of search modules 603a to 603d. The spectrometer 601, control module 602, analysis module 604 and search modules 603a to 603d may be distributed across a network or integrated together. The control module 602, the analysis module 604 and the plurality of search modules 603a to 603d may be implemented in software running on a general-purpose computer having an output device, such as a display or communication interface. The analysis module implements an analysis method according to the invention, such as the method described with reference to FIG. 2. Each search module 603a to 603d implements a different search algorithm for finding a set of components to be passed to the analysis module 604. The search algorithms may be one or more of the search algorithms described with reference to FIGS. 3 to 6.

On receiving spectral data from the spectrometer 601, the control module 602 calls one of the search modules 603a to 603d to find a set of components that best fits the spectral data in accordance with the search algorithm. The spectral data may be sent as a parameter or argument to the relevant search module 603a to 603d. The search module 603a to 603d called by the control module 604 may depend on a user selection, an expected attribute of the sample that generated the spectral data (such as an expected number of chemical components in the sample) and/or a number of spectra received within a unit time. A set of components and resolved model (mixture spectrum) returned to the control module 602 by the search module 603a to 603d are sent to the analysis module 604, which determines which components can be justified as present in the sample from the spectral data. Identifiers identifying the components justified as being present in the sample by the analysis module 604 are returned to the control module 602. The control module 602 may generate a signal for controlling an external device, such a signal controlling a device carrying out a process to produce the sample and/or carrying out subsequent processing of the sample based upon the components identified as present in the sample or a device that generates an alert based upon the components identified as present in the sample.

It will be understood that alterations and modifications to the above described embodiments of the invention may be made without departing from the invention as defined herein. For example, the search algorithm shown in FIG. 3 could be used as both the search algorithm and the analysis algorithm, with the algorithm carrying out a full search and returning the set of components that results in the resolved model with the lowest BIC value. The search algorithms may use a figure of merit other than BIC or the dewiggle method as a measure to differentiate between the best fitting one of the plurality of models fitted to the spectral data/fit target in each iteration. For example, the measure may be an improvement in a measure of lack of fit. The iterative process of the search algorithm may continue until a maximum number of components is reached regardless whether or not the lowest BIC value for each iteration is lower than that for the previous iteration. Other methods of modelling the background spectrum and/or blank spectrum may be used. A weighting between the term $[N_p \times (MSY)]$ defining fit quality and the term $[N_v \times \log (N_p)]$ defining the complexity penalty may be adjusted, for example for factors such as spectrum size and noise sources.

The invention claimed is:

1. A method of determining components present in a sample, the method comprising:

obtaining spectral data by carrying out Raman spectroscopy on the sample by:

(i) exposing the sample to a laser beam;

(ii) collecting light scattered from the sample;

(iii) filtering the collected light to reject Rayliegh scattered light having a same frequency as the laser beam and allowing Raman scattered light to travel to a Raman analyser, the Raman analyser spectrally dispersing the Raman scattered light across a photodetector; and (iv) recording the spectral data with the photodetector;

resolving each of a plurality of models of the spectral data, the plurality of models comprising models having different numbers of component reference spectra selected from a set of predetermined component reference spectra;

selecting one of the plurality of models based upon a model selection criterion; and determining one or more components present in the sample based upon the selected model, wherein:

the model selection criterion comprises a measure for each model of the plurality of models, the measure balancing improvements in fit quality of the model to the spectral data against a complexity penalty determined from the number of component reference spectrum used in the model;

the resolving of each of the plurality of models comprises:

resolving a current model of the plurality of models of the spectral data using a current set of component reference spectra;

determining a current measure for the current model based upon the model selection criterion;

resolving a plurality of further models of the plurality of models of the spectral data, each further model using a further set of the component reference spectra comprising the current set with a different one of the component reference spectra removed; and determining a further measure for each of the further models based upon the model selection criterion; and the selecting of one of the plurality of models comprises comparing the further measures to the current measure and selecting a best further model to be a new current model if the further measure for that best further model is better than the current measure.

2. The method according to claim 1, wherein:

the exposing of the sample to the laser beam comprises reflecting the laser beam by a dichroic filter and then focusing the laser beam on the sample by way of an objective lens;

the light scattered from the sample is collected by the objective lens;

the collected light is filtered by the dichroic filter; and the Raman scattered light spectrally dispersed by the Raman analyser is focused onto the photodetector by another lens.

3. A method of determining components present in a sample, the method comprising:

obtaining spectral data by carrying out Raman spectroscopy on the sample by:

(i) exposing the sample to a laser beam;

(ii) collecting light scattered from the sample;

(iii) filtering the collected light to reject Rayliegh scattered light having a same frequency as the laser beam and allowing Raman scattered light to travel to a Raman analyser, the Raman analyser spectrally dispersing the Raman scattered light across a photodetector; and (iv) recording the spectral data with the photodetector; and in an iterative process:

resolving each of a plurality of models of the spectral data, the plurality of models comprising models having different numbers of component reference spectra selected from a set of predetermined component reference spectra;

selecting one of the plurality of models based upon a model selection criterion; and determining one or more components present in the sample based upon the selected model, wherein:

the model selection criterion comprises a measure for each model of the plurality of models of spectral data, the measure balancing improvements in fit quality of the model to the spectral data against a complexity penalty determined from the number of component reference spectrum used in the model, and the method further comprises, in each iteration, storing/updating a number of selected models based upon the model selection criterion from all iterations carried out up to that point, the number of selected models being greater than 1.

4. The method according to claim 1, wherein the model selection criterion is a Bayesian information criterion (BIC).

5. The method according to claim 1, wherein the selected one of the plurality of models has an extremum value for the measure of the model selection criterion.

6. The method according to claim 1, wherein the resolving of each model comprises a least-squares fitting of the component reference spectra to the spectral data.

7. The method according to claim 1, comprising repeating the steps in an iterative process until none of the further measures are better than the current measure.

8. The method according to claim 7, wherein the current set of the component reference spectra for a first iteration of the iterative process is a set of the component reference spectra found using a search algorithm.

9. The method according to claim 8, wherein the search algorithm comprises resolving a model of the spectral data separately for candidates from a set of predetermined component reference spectra and selecting a candidate component reference spectrum of the candidate component reference spectra to be included in the current set of the component reference spectra for the initial iteration based on a figure of merit.

10. The method according to claim 1, comprising carrying out spectroscopy of the sample with a spectrometer system to obtain the spectral data.

11. A spectrometer system comprising:
a spectrometer for obtaining spectral data from a sample; and
a processor, wherein
the spectrometer system is arranged to carry out the method of claim 1.

12. A non-transitory computer readable medium having instructions stored thereon, which instructions, when executed by a processor of a spectrometer system comprising a spectrometer for obtaining spectral data from a sample, cause the spectrometer system to carry out the method of claim 1.

13. The method according to claim 3, wherein the model selection criterion is a Bayesian information criterion (BIC).

14. The method according to claim 3, wherein the selected one of the plurality of models has an extremum value for the measure of the model selection criterion.

15. The method according to claim 3, wherein the resolving of each model comprises a least-squares fitting of the component reference spectra to the spectral data.

16. The method according to claim 3, comprising carrying out spectroscopy of the sample with a spectrometer system to obtain the spectral data.

17. A spectrometer system comprising:
a spectrometer for obtaining spectral data from a sample; and
a processor, wherein
the spectrometer system is arranged to carry out the method of claim 3.

18. A non-transitory computer readable medium having instructions stored thereon, which instructions, when executed by a processor of a spectrometer system comprising a spectrometer for obtaining spectral data from a sample, cause the spectrometer system to carry out the method of claim 3.

* * * * *